US012800039B2

(12) United States Patent
Huang et al.

(10) Patent No.: US 12,800,039 B2
(45) Date of Patent: Nov. 17, 2026

(54) EFFORTLESS RESETTABLE ENGINE SWITCHING STRUCTURE

(71) Applicant: RUNNER (XIAMEN) CORP., Xiamen (CN)

(72) Inventors: Huanlong Huang, Xiamen (CN); Weiwu Su, Xiamen (CN); Shengchao Dai, Xiamen (CN)

(73) Assignee: RUNNER (XIAMEN) CORP., Xiamen (CN)

( * ) Notice: Subject to any disclaimer, the term of this patent is extended or adjusted under 35 U.S.C. 154(b) by 84 days.

(21) Appl. No.: 18/983,430

(22) Filed: Dec. 17, 2024

(65) Prior Publication Data

US 2025/0277532 A1 Sep. 4, 2025

(30) Foreign Application Priority Data

Mar. 1, 2024 (CN) ........................ 202410233836.X

(51) Int. Cl.

| | |
|---|---|
| ***F16K 31/54*** | (2006.01) |
| ***F16K 11/074*** | (2006.01) |
| ***F16K 11/085*** | (2006.01) |
| ***F16K 31/528*** | (2006.01) |

(52) U.S. Cl.
CPC ........ *F16K 11/0853* (2013.01); *F16K 11/074* (2013.01); *F16K 31/5284* (2013.01); *F16K 31/54* (2013.01)

(58) Field of Classification Search
CPC ............................... F16K 34/54; F16K 31/563
See application file for complete search history.

(56) References Cited

U.S. PATENT DOCUMENTS

2005/0205143 A1* 9/2005 Hughes ............... F16K 11/0716 137/625.29

* cited by examiner

*Primary Examiner* — Paul J Gray
(74) *Attorney, Agent, or Firm* — Yuhao Liang

(57) ABSTRACT

An effortless resettable engine switching structure includes a main body, where a water division chamber is provided in the main body; the main body is further provided with at least two water outlet holes that can communicate with the water division chamber; a rotatable switching bracket is provided in the water division chamber; one end of the switching bracket is provided with a sealing gasket; and the sealing gasket is cooperatively connected to each of the water outlet holes and block the water outlet hole that cooperates with the sealing gasket. The effortless resettable engine switching structure reduces product size by simplifying the structure, achieves energy saving in product production, and improves product competitiveness.

19 Claims, 8 Drawing Sheets

EFFORTLESS RESETTABLE ENGINE SWITCHING STRUCTURE

CROSS REFERENCE TO THE RELATED APPLICATIONS

This application is based upon and claims priority to Chinese Patent Application No. 202410233836.X, filed on Mar. 1, 2024, the entire contents of which are incorporated herein by reference.

TECHNICAL FIELD

The present disclosure relates to an effortless resettable engine switching structure.

BACKGROUND

There are currently many types of switching engines, among which engines with automatic reset function are becoming increasingly popular among consumers. However, existing resettable engines suffer from complex structures and occupy a large amount of space, making products with the engine structure bulky overall. The prior art adopts a cat-eye gasket structure, which requires the addition of a spring and a water passing hole. However, the design of the spring requires an increase in size, which does not meet the requirements of small-sized products, and the water passing hole will increase the difficulty and cost of component production processes.

SUMMARY

In order to solve the above technical problems, an objective of the present disclosure is to provide an effortless resettable engine switching structure.

The present disclosure is achieved by the following technical solution.

An effortless resettable engine switching structure includes a main body, where a water division chamber is provided in the main body; the main body is further provided with at least two water outlet holes that can communicate with the water division chamber; a rotatable switching bracket is provided in the water division chamber; one end of the switching bracket is provided with a sealing gasket; and the sealing gasket is cooperatively connected to each of the water outlet holes and block the water outlet hole that cooperates with the sealing gasket.

In an embodiment of the present disclosure, an end of the sealing gasket can seal the corresponding water outlet hole; the sealing gasket is further cooperatively connected to a water flow in the water division chamber; and the water flow in the water division chamber can drive the sealing gasket to move towards the water outlet hole.

In an embodiment of the present disclosure, one end of the switching bracket facing the water outlet hole is provided with a groove; the sealing gasket is located in the groove; the switching bracket is further provided with a water inlet gap; and the water inlet gap can communicate the water division chamber with the groove, allowing the water flow from the water division chamber to enter the groove and act on the sealing gasket, thereby driving the sealing gasket to block the water outlet hole.

In an embodiment of the present disclosure, a pressure chamber is formed between the sealing gasket and the groove, and the pressure chamber is communicated with the water division chamber through a water passing gap.

In an embodiment of the present disclosure, the effortless resettable engine switching structure further includes a driving component; the driving component can drive the switching bracket to rotate, so as to switch the sealing gasket between different water outlet holes; and a reset spring is provided between the driving component and the main body.

In an embodiment of the present disclosure, the other end of the switching bracket is provided with a shaft hole and a pin shaft that are coaxially arranged; a protruding post is provided in the water division chamber and can cooperate with the shaft hole; the pin shaft can extend outside the main body; a gear is further provided on the main body and rotatable synchronously with the pin shaft; the main body is further provided with the driving component for driving the gear to rotate; and the driving component is provided with a rack that can mesh with the gear.

In an embodiment of the present disclosure, a sealing ring is sleeved on an outer periphery of the pin shaft and can hermetically cooperate with the main body; a clamping slot is formed in the pin shaft located outside the main body; the gear is sleeved on the outer periphery of the pin shaft; and an inner periphery of the gear is provided with a connecting key that can cooperate with the clamping slot.

In an embodiment of the present disclosure, a first spring is further provided in the water division chamber; one end of the first spring is connected to the main body, and the other end of the first spring is connected to the switching bracket; and the first spring can allow the switching bracket to rotate and reset.

In an embodiment of the present disclosure, the other end of the switching bracket is provided with a first pin shaft and a second pin shaft that are coaxially arranged; a recessed hole is provided in the water division chamber and can cooperate with the first pin shaft; the second pin shaft can extend outside the main body; a swing rod is provided outside the main body and rotatable synchronously with the switching bracket; and the driving component can drive the swing rod to rotate.

In an embodiment of the present disclosure, the swing rod is provided with a cooperating inclined surface; the driving component can abut against and cooperate with the cooperating inclined surface, such that the driving component moves to drive the swing rod to rotate; an outer periphery of the second pin shaft located outside the main body is provided with a polygonal element; and the swing rod is further provided with a polygonal groove that can cooperate with the polygonal element, such that the swing rod and the switching bracket rotate synchronously.

The effortless resettable engine switching structure provided by the present disclosure has the following beneficial effects. The effortless resettable engine switching structure achieves modular production, reduces the required switching force, is suitable for more users, improves the user experience, adapts to various products, and has strong universality.

BRIEF DESCRIPTION OF THE DRAWINGS

To describe the technical solutions in the present disclosure more clearly, the drawings required for describing the embodiments or the prior art will be briefly described below. Apparently, the drawings in the following description show merely some embodiments of the present disclosure, and those of ordinary skill in the art may still derive other drawings from these drawings without creative efforts.

DETAILED DESCRIPTION OF THE EMBODIMENTS

Figure 1:
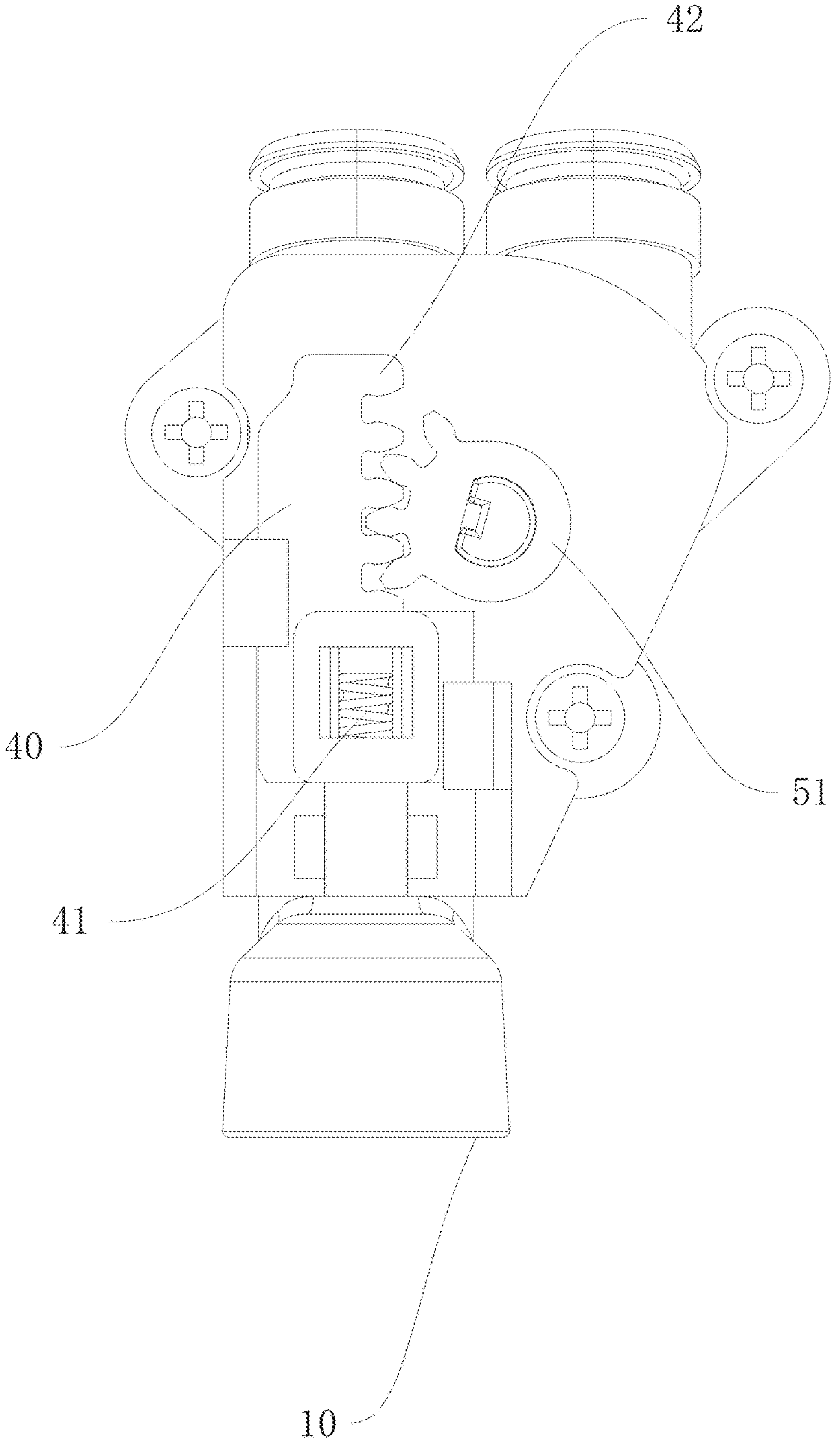
FIG. 1 is a first schematic view of a first embodiment of the present disclosure.

In order to make the objectives, technical solutions, and advantages of the implementations of the present disclosure clearer, the technical solutions in the implementations of the present disclosure are clearly and completely described below in conjunction with the drawings in the implementations of the present disclosure. Obviously, the described implementations are some, rather than all of the implementations of the present disclosure. On the basis of the implementations of the present disclosure, all other implementations obtained by those of ordinary skill in the art without making creative efforts should fall within the protection scope of the present disclosure. Therefore, the detailed description of the implementations of the present disclosure in the drawings is not intended to limit the protection scope of the present disclosure, but merely to represent the selected implementations of the present disclosure. On the basis of the implementations of the present disclosure, all other implementations obtained by those of ordinary skill in the art without making creative efforts should fall within the protection scope of the present disclosure.

It should be understood that, in the description of the present disclosure, the terms such as "central", "longitudinal", "transverse", "long", "wide", "thick", "upper", "lower", "front", "back", "left", "right", "vertical", "horizontal", "top", "bottom", "inner", "outer", "clockwise", and "anticlockwise" are intended to indicate orientation or position relationships shown in accompanying drawings, and these terms are merely intended to facilitate the description of the present disclosure or simplify the description, rather than to indicate or imply that the mentioned apparatus or elements must have the specific orientation or be constructed and operated in the specific orientation. Therefore, these terms may not be construed as a limitation to the present disclosure.

In addition, the terms "first" and "second" are merely intended for a purpose of description, and should not be understood as an indication or implication of relative importance or implicit indication of a quantity of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified, terms such as "installation", "interconnection", "connection", and "fixation" are intended to be understood in a broad sense. For example, "connection" may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present disclosure based on a specific situation.

In the present disclosure, unless otherwise expressly specified, when it is described that a first feature is "above" or "under" a second feature, it may indicate that the first feature is in direct contact with the second feature, or that the first feature and the second feature are not in direct contact with each other but are in contact via another feature between them. In addition, that the first feature is "over", "above", and "on" the second feature includes that the first feature is directly above and diagonally above the second feature, or simply indicates that a horizontal height of the first feature is larger than that of the second feature. "A first feature is under, at a lower side of, or below a second feature" includes "the first feature is directly under or obliquely under the second feature" or simply means that "the first feature is lower than the second feature in terms of horizontal height".

Referring to the drawings of the specification, an effortless resettable engine switching structure includes main body 10. Water division chamber 11 is provided in the main body. The main body is further provided with water inlet channel 12 for directing a water flow towards the water division chamber. The main body is further provided with at least two water outlet holes 13 that can communicate with the water division chamber. The water outlet holes are located on a peripheral side wall of the water division chamber. Rotatable switching bracket 20 is provided in the water division chamber. One end of the switching bracket is provided with sealing gasket 30. The sealing gasket is cooperatively connected to each of the water outlet holes and block the water outlet hole that cooperates with the sealing gasket hole. The function of the sealing gasket is to block the water outlet hole, changing the original function of the sealing gasket for water discharge. The design eliminates the need for a compression spring, reduces production difficulty, and effectively lowers costs. In an embodiment, there are only two water outlet holes provided. When the sealing gasket is connected to one of the water outlet holes, only the other water outlet hole allows water discharge. Of course, there may also be three water outlet holes provided. In this case, one water outlet hole is blocked, and the other two water outlet holes allow water discharge. Thus, the product can form a combination of water splashes.

Preferably, an end 31 of the sealing gasket can seal the corresponding water outlet hole. Here, the end of the sealing gasket refers to an end surface of the sealing gasket facing an inner peripheral wall of the water division chamber. The sealing gasket can further be cooperatively connected to a water flow in the water division chamber. The water flow in the water division chamber drives the sealing gasket to move towards the water outlet hole. In this way, the water pressure in the water division chamber provides a tight pressure on the other end surface 32 of the sealing gasket, such that the sealing gasket moves closer to the water outlet hole and blocks the water outlet hole. Compared to the previous design that requires the addition of a spring, the structure of the present disclosure saves the use of components, reduces component size, makes the entire product more compact, lowers overall size, and reduces space occupation.

Further, one end of the switching bracket facing the water outlet hole is provided with groove 21. The sealing gasket is located in the groove. The sealing gasket is directly inserted into the groove without the need for another component.

Compared to the previous design that uses a pre-loading spring, the present disclosure reduces the use of components. The switching bracket is further provided with water inlet gap 22. The water inlet gap can communicate the water division chamber with the groove, allowing the water flow from the water division chamber to enter the groove and act on the sealing gasket, thereby driving the sealing gasket to block the water outlet hole. That is to say, the water in the water division chamber can enter the groove through the water inlet gap and act on the other end surface 32 of the sealing gasket. In this way, the water pressure provides a force to press the sealing gasket towards the water outlet hole.

Furthermore, pressure chamber 23 can be formed between the sealing gasket and the groove. Except for a sealing gasket mounting area, other areas of the groove form the pressure chamber. The pressure chamber is communicated with the water division chamber through a water passing gap, and the water flow in the water division chamber enters the pressure chamber through the water passing gap, and the water pressure in the pressure chamber acts on the sealing gasket to press it towards the water outlet hole. Of course, receiving surface 24 is provided in the groove and configured to block the sealing gasket.

Preferably, the effortless resettable engine switching structure further includes driving component 40. The driving component can drive the switching bracket to rotate, so as to switch the sealing gasket between different water outlet holes. Reset spring 41 is provided between the driving component and the main body. When the driving component moves, the switching bracket rotates to complete the switching work. Then, releasing action is performed. Under the action of the reset spring, the driving component is reset, the switching bracket is rotated and reset, and the original water discharge mode is maintained.

Figure 2:
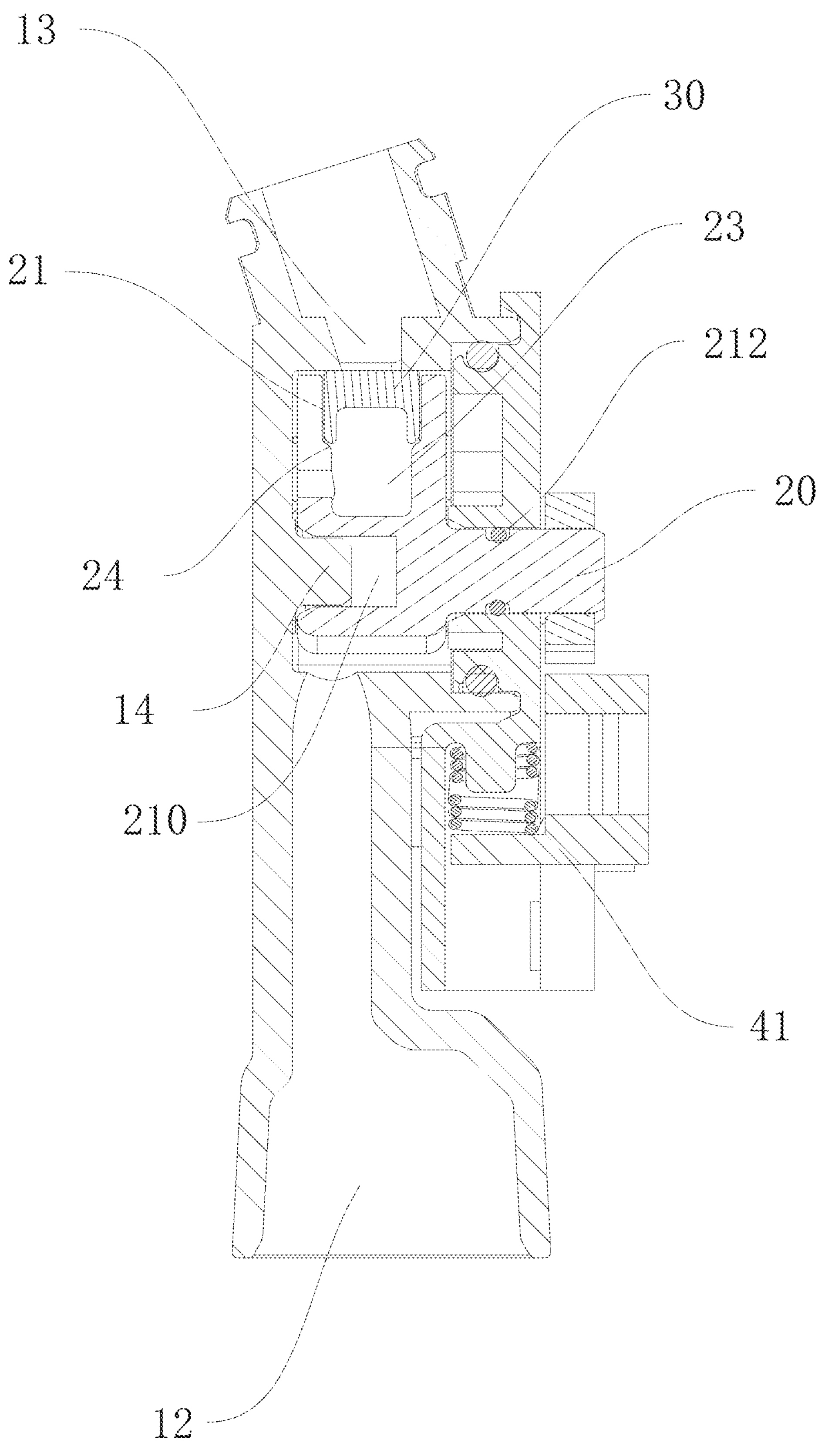
FIG. 2 is a second schematic view of the first embodiment of the present disclosure.
Figure 3:
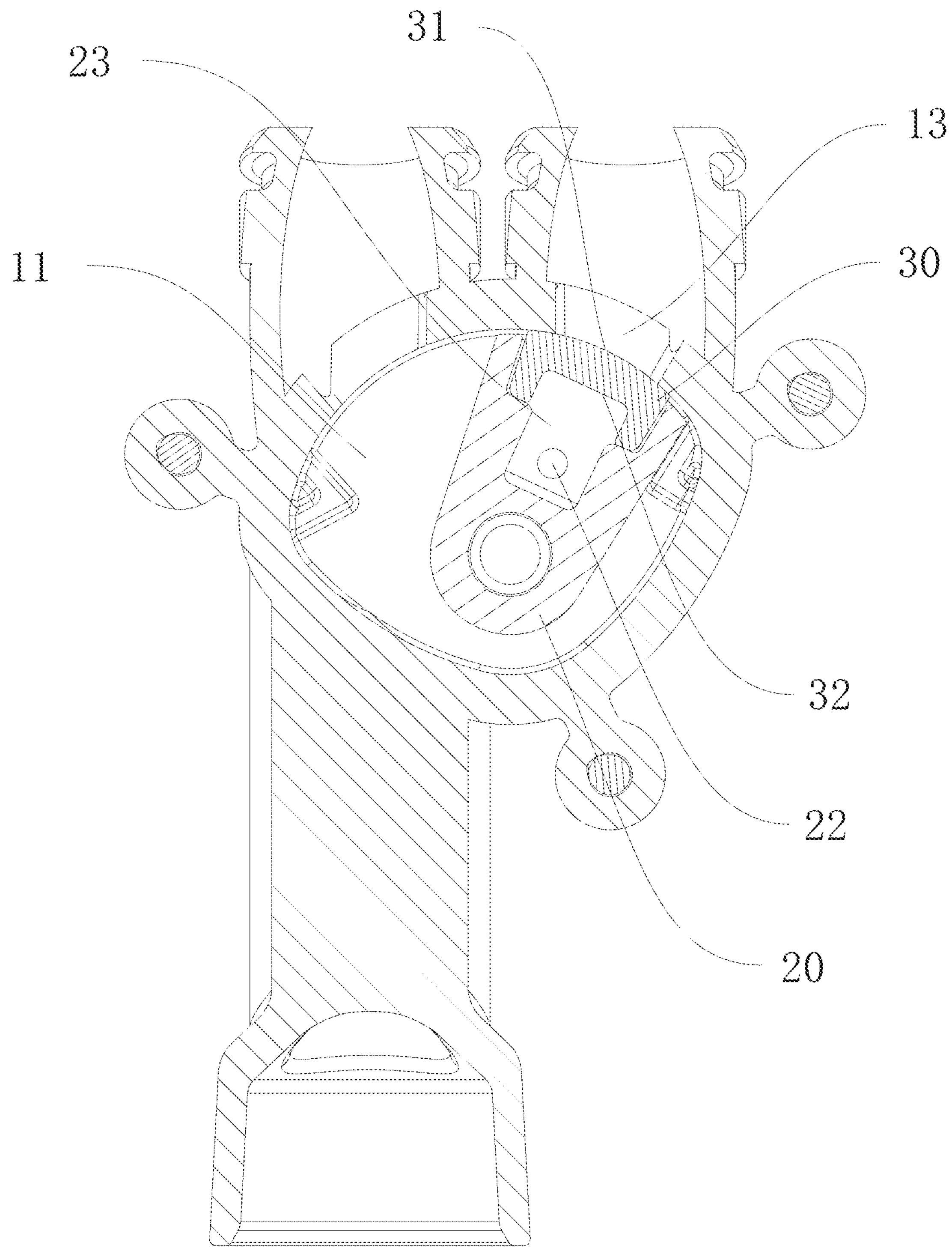
FIG. 3 is a third schematic view of the first embodiment of the present disclosure.
Figure 4:
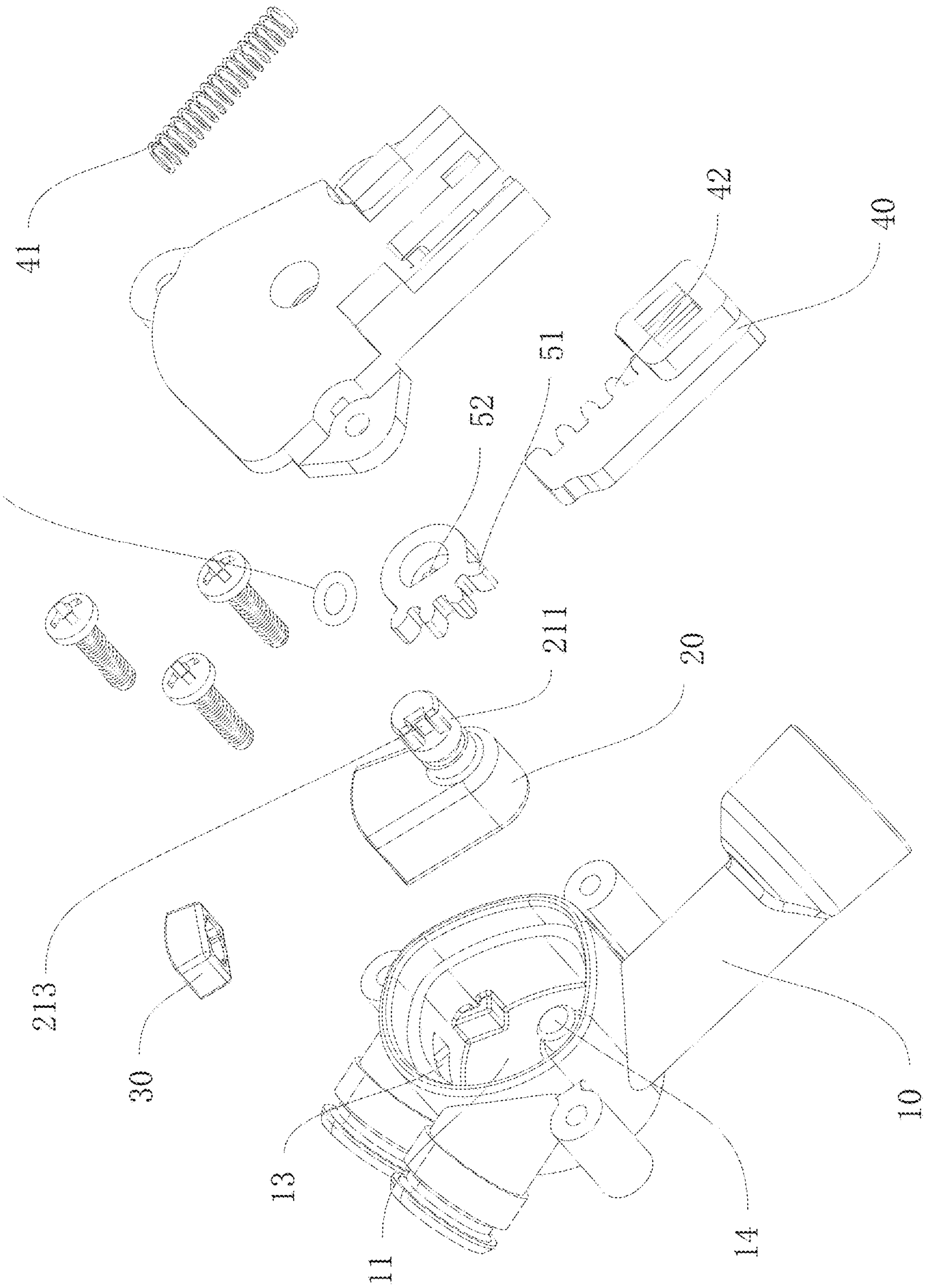
FIG. 4 is an exploded view of the first embodiment of the present disclosure.

Referring to FIGS. 1 to 4 of the specification, in a first embodiment of the present disclosure, the other end of the switching bracket is provided with shaft hole 210 and pin shaft 211 that are coaxially arranged. Protruding post 14 is provided in the water division chamber and can cooperate with the shaft hole to allow the switching bracket to rotate around the protruding post. The pin shaft can extend outside the main body. Gear 51 is further provided on the main body and rotatable synchronously with the pin shaft. The main body is further provided with a driving component for driving the gear to rotate. The driving component is provided with rack 42 that can mesh with the gear. The driving component moves in a straight line, causing the rack to drive the gear to rotate, thereby driving the switching bracket to rotate.

Further, sealing ring 212 is sleeved on an outer periphery of the pin shaft and can hermetically cooperate with the main body to ensure structural sealing. Clamping slot 213 is formed in the pin shaft located outside the main body. The gear is sleeved on the outer periphery of the pin shaft. An inner periphery of the gear is provided with connecting key 52 that can cooperate with the clamping slot.

Figure 5:
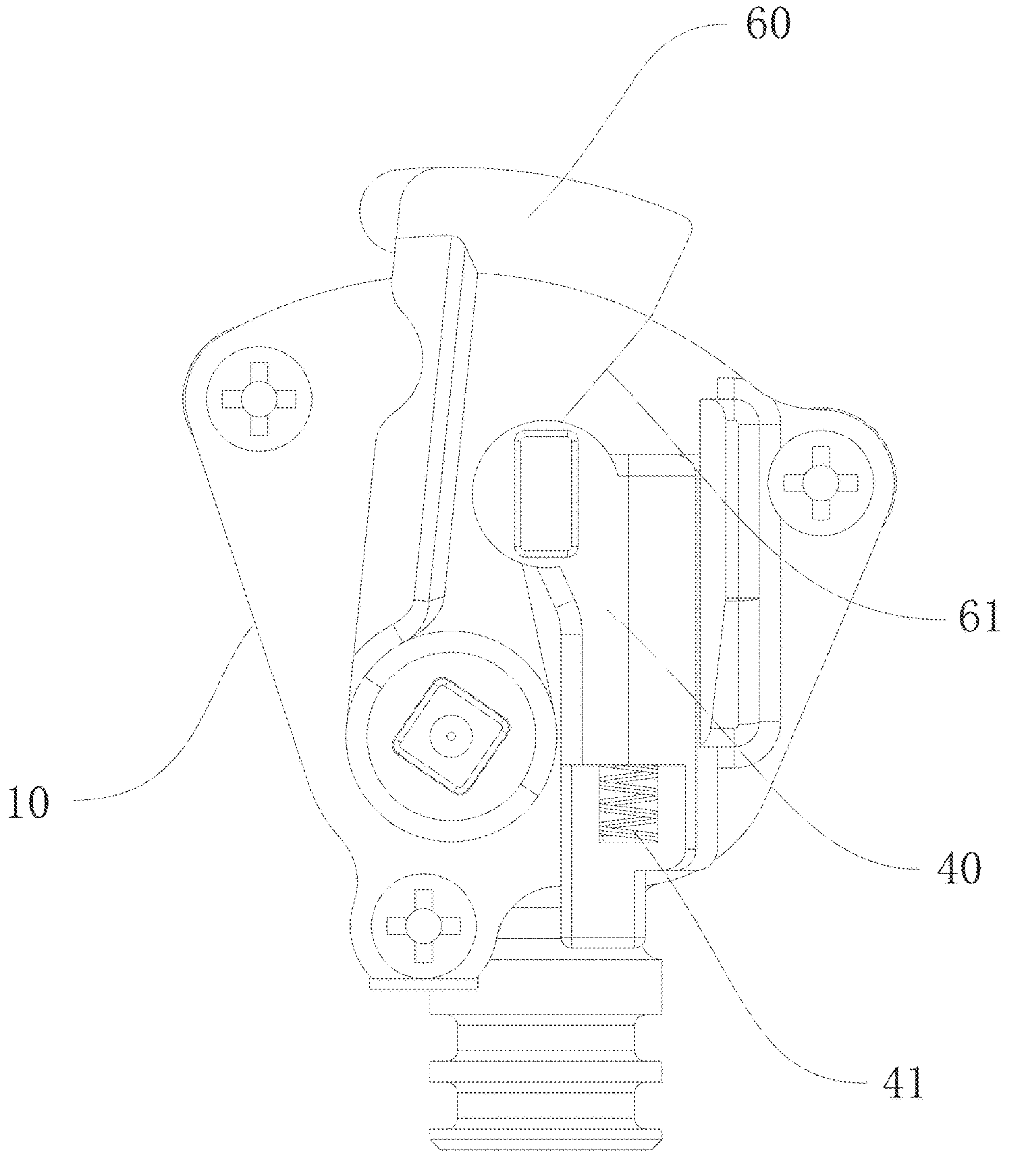
FIG. 5 is a first schematic view of a second embodiment of the present disclosure.
Figure 6:
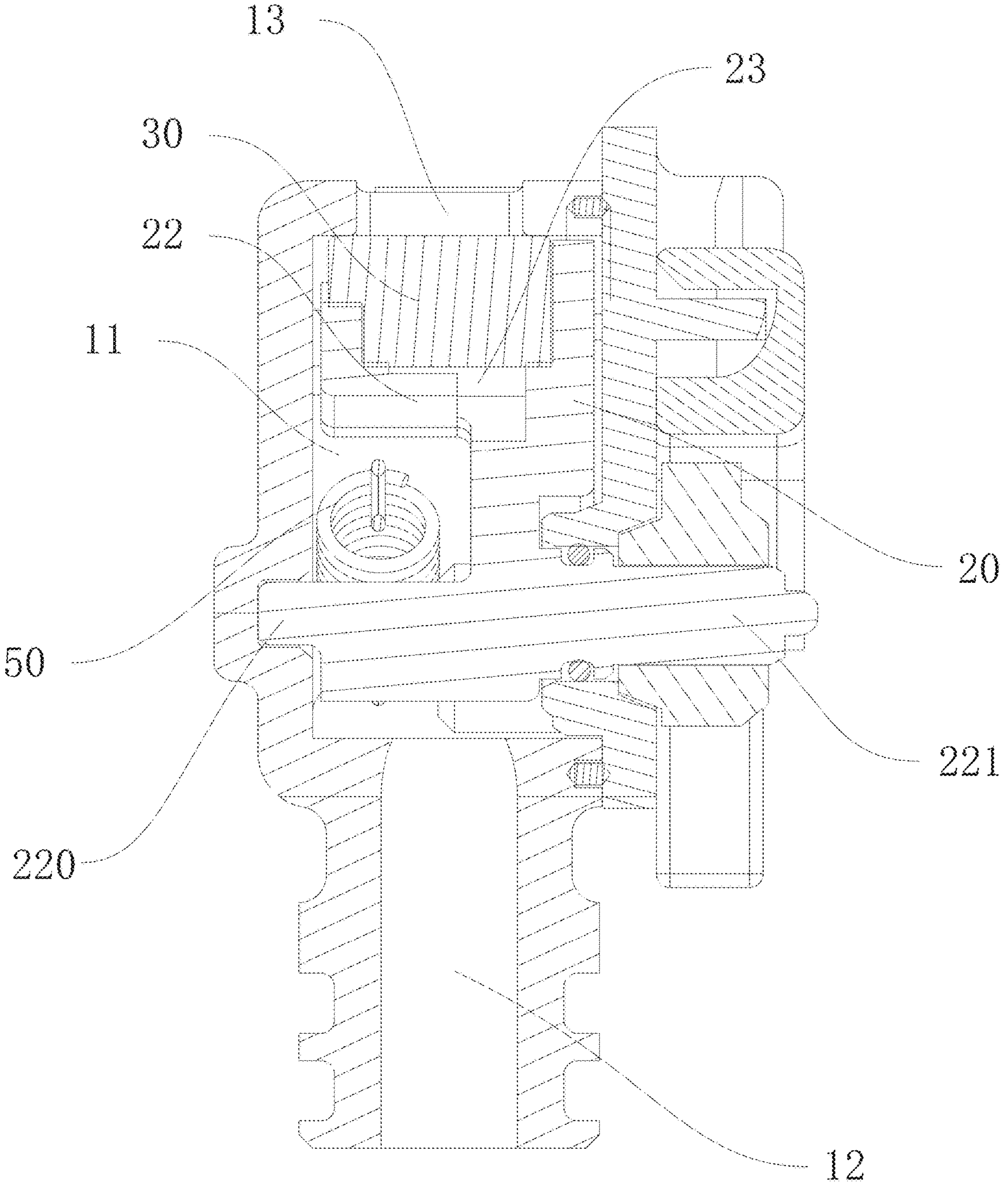
FIG. 6 is a second schematic view of the second embodiment of the present disclosure.
Figure 7:
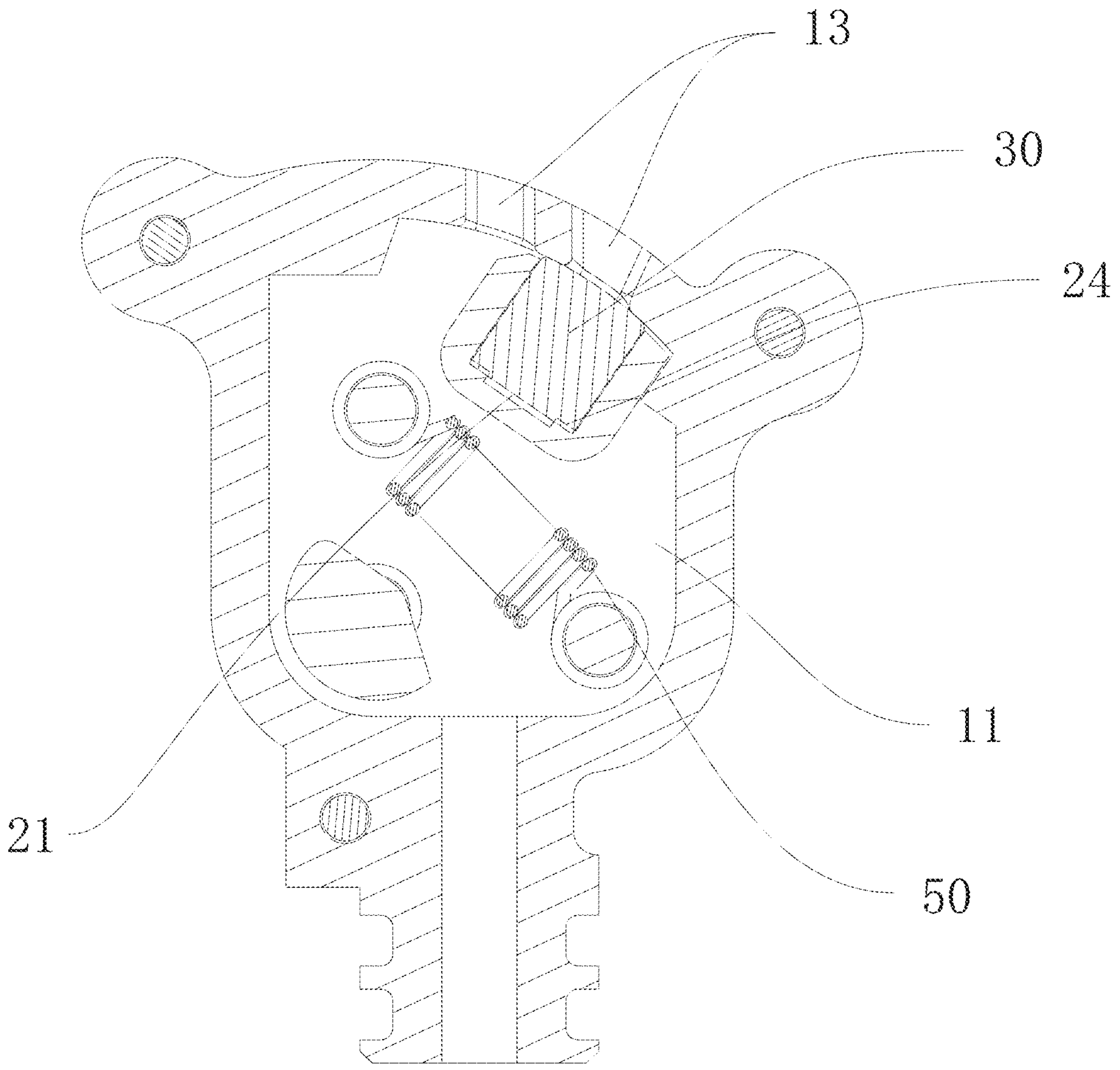
FIG. 7 is a third schematic view of the second embodiment of the present disclosure.
Figure 8:
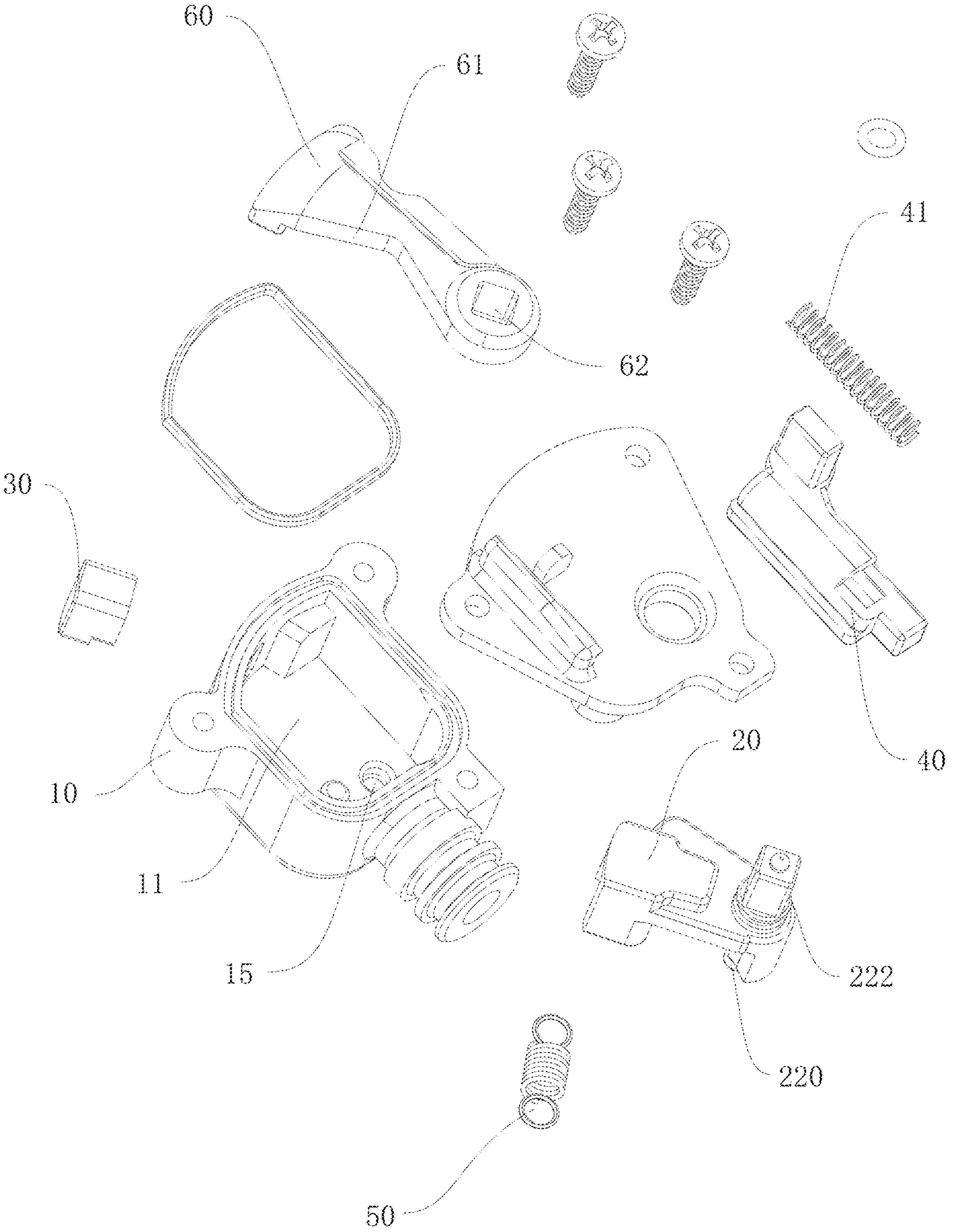
FIG. 8 is an exploded view of the second embodiment of the present disclosure.

Referring to FIGS. 5 to 8 of the specification, in a second embodiment of the present disclosure, first spring 50 is further provided in the water division chamber. One end of the first spring is connected to the main body, and the other end of the first spring is connected to the switching bracket. The first spring can allow the switching bracket to rotate and reset. The combination of the first spring and the reset spring drives the switching bracket to reset faster. In use, the first spring can be a tension spring or a compression spring. The driving component indirectly drives the switching bracket to rotate. The reset spring alone may have the problem of delayed reset, making it fail to guarantee better resetting of the switching bracket. When the driving component is not under force, the reset spring and the first spring act simultaneously to ensure timely resetting of the switching bracket.

Preferably, the other end of the switching bracket is provided with first pin shaft 220 and second pin shaft 221 that are coaxially arranged. Recessed hole 15 is provided in the water division chamber and can cooperate with the first pin shaft. The second pin shaft can extend outside the main body. Swing rod 60 is provided outside the main body and rotatable synchronously with the switching bracket. The driving component can drive the swing rod to rotate.

Further, the swing rod is provided with cooperating inclined surface 61. The driving component can abut against and cooperate with the cooperating inclined surface, such that the driving component moves to drive the swing rod to rotate. An outer periphery of the second pin shaft located outside the main body is provided with polygonal element 222. The swing rod is further provided with polygonal groove 62 that can cooperate with the polygonal element, such that the swing rod and the switching bracket rotate synchronously.

More specifically, in the present disclosure, the engine switching is achieved by a back-and-forth rotation design using a switching lever. The sealing gasket achieves side sealing. The present disclosure reduces the use of components, thereby reducing the space required for the structure. The sealing gasket adopts a no-water-passage design (the hole corresponding to the position of the sealing gasket does not allow water to flow out). Compared to a traditional design that relies on the sealing gasket to achieve functionality, the present disclosure further reduces the size of the sealing gasket, lowers friction, saves space, reduces switching force, and improves the switching feel. There is a water passing gap on the back of a joint between the sealing gasket and the switching bracket, which uses the water pressure to press the sealing gasket tightly against the water outlet hole of the main body, achieving a sealing effect. Compared to a traditional structure, the present disclosure achieves the product sealing requirement with less compression, thereby reducing switching force.

The above explanation shows and describes several preferred embodiments of the present disclosure. But as mentioned above, it should be understood that the present disclosure is not limited to the form disclosed herein, and the explanation should not be regarded as an exclusion of other embodiments. It can also apply to various combinations, modifications and scenarios in other form, and changes can be made through the above guides and technologies or knowledge in the related fields within the scope of conception of the present disclosure described herein. Modifications and changes made by those skilled in the art without departing from the spirit and scope of the present disclosure should fall within the protection scope of the appended claims of the present disclosure.

The invention claimed is:

1. An effortless resettable engine switching structure, comprising a main body, wherein a water division chamber is provided in the main body; the main body is further provided with at least two water outlet holes configured to communicate with the water division chamber; a switching bracket is provided in the water division chamber and configured to rotate; a first end of the switching bracket is provided with a sealing gasket; and the sealing gasket is cooperatively connected to each of the at least two water outlet holes and block a water outlet hole of the at least two water outlet holes, wherein the water outlet hole cooperates with the sealing gasket;

wherein the effortless resettable engine switching structure further comprises a driving component, wherein the driving component is configured to drive the switching bracket to rotate, so as to switch the sealing gasket between the at least two water outlet holes;

and a reset spring is provided between the driving component and the main body.

2. The effortless resettable engine switching structure according to claim 1, wherein an end of the sealing gasket is configured to seal the water outlet hole that cooperates with the sealing gasket; the sealing gasket is further cooperatively connected to a water flow in the water division chamber; and the water flow in the water division chamber is configured to drive the sealing gasket to move towards the water outlet hole that cooperates with the sealing gasket.

3. The effortless resettable engine switching structure according to claim 2, wherein the first end of the switching bracket faces the water outlet hole and is provided with a groove; the sealing gasket is located in the groove; the switching bracket is further provided with a water inlet gap; and the water inlet gap is configured to communicate the water division chamber with the groove, allowing the water flow from the water division chamber to enter the groove and act on the sealing gasket, thereby driving the sealing gasket to block the water outlet hole.

4. The effortless resettable engine switching structure according to claim 3, wherein a pressure chamber is formed between the sealing gasket and the groove, and the pressure chamber is communicated with the water division chamber through a water passing gap.

5. The effortless resettable engine switching structure according to claim 1 wherein a second end of the switching bracket is provided with a shaft hole and a pin shaft, wherein the shaft hole and the pin shaft are coaxially arranged; a protruding post is provided in the water division chamber and configured to cooperate with the shaft hole; the pin shaft is configured to extend outside the main body; a gear is further provided on the main body and rotatable synchronously with the pin shaft; the main body is further provided with the driving component for driving the gear to rotate; and the driving component is provided with a rack configured to mesh with the gear.

6. The effortless resettable engine switching structure according to claim 5, wherein a sealing ring is sleeved on an outer periphery of the pin shaft and configured to hermetically cooperate with the main body; a clamping slot is formed in the pin shaft located outside the main body; the gear is sleeved on the outer periphery of the pin shaft;

and an inner periphery of the gear is provided with a connecting key configured to cooperate with the clamping slot.

7. The effortless resettable engine switching structure according to claim 1 wherein a first spring is further provided in the water division chamber; a first end of the first spring is connected to the main body, and a second end of the first spring is connected to the switching bracket; and the first spring is configured to allow the switching bracket to rotate and reset.

8. The effortless resettable engine switching structure according to claim 7, wherein a second end of the switching bracket is provided with a first pin shaft and a second pin shaft, wherein the first pin shaft and the second pin shaft are coaxially arranged; a recessed hole is provided in the water division chamber and configured to cooperate with the first pin shaft; the second pin shaft is configured to extend outside the main body; a swing rod is provided outside the main body and rotatable synchronously with the switching bracket; and the driving component is configured to drive the swing rod to rotate.

9. The effortless resettable engine switching structure according to claim 8, wherein the swing rod is provided with a cooperating inclined surface; the driving component is configured to abut against and cooperate with the cooperating inclined surface, such that the driving component moves to drive the swing rod to rotate; an outer periphery of the second pin shaft located outside the main body is provided with a polygonal element; and the swing rod is further provided with a polygonal groove configured to cooperate with the polygonal element, such that the swing rod and the switching bracket rotate synchronously.

10. The effortless resettable engine switching structure according to claim 2, further comprising a driving component, wherein the driving component is configured to drive the switching bracket to rotate, so as to switch the sealing gasket between the at least two water outlet holes; and a reset spring is provided between the driving component and the main body.

11. The effortless resettable engine switching structure according to claim 3, further comprising a driving component, wherein the driving component is configured to drive the switching bracket to rotate, so as to switch the sealing gasket between the at least two water outlet holes; and a reset spring is provided between the driving component and the main body.

12. The effortless resettable engine switching structure according to claim 4, further comprising a driving component, wherein the driving component is configured to drive the switching bracket to rotate, so as to switch the sealing gasket between the at least two water outlet holes; and a reset spring is provided between the driving component and the main body.

13. The effortless resettable engine switching structure according to claim 10, wherein a second end of the switching bracket is provided with a shaft hole and a pin shaft, wherein the shaft hole and the pin shaft are coaxially arranged; a protruding post is provided in the water division chamber and configured to cooperate with the shaft hole;

the pin shaft is configured to extend outside the main body; a gear is further provided on the main body and rotatable synchronously with the pin shaft; the main body is further provided with the driving component for driving the gear to rotate; and the driving component is provided with a rack configured to mesh with the gear.

14. The effortless resettable engine switching structure according to claim 13, wherein a sealing ring is sleeved on an outer periphery of the pin shaft and configured to hermetically cooperate with the main body; a clamping slot is formed in the pin shaft located outside the main body; the gear is sleeved on the outer periphery of the pin shaft;

and an inner periphery of the gear is provided with a connecting key configured to cooperate with the clamping slot.

15. The effortless resettable engine switching structure according to claim 10, wherein a first spring is further provided in the water division chamber; a first end of the first spring is connected to the main body, and a second end of the first spring is connected to the switching bracket; and the first spring is configured to allow the switching bracket to rotate and reset.

16. The effortless resettable engine switching structure according to claim 15, wherein a second end of the switching bracket is provided with a first pin shaft and a second pin shaft, wherein the first pin shaft and the second pin shaft are coaxially arranged; a recessed hole is provided in the water division chamber and configured to cooperate with the first pin shaft; the second pin shaft is configured to extend outside the main body; a swing rod is provided outside the main body and rotatable synchronously with the switching bracket; and the driving component is configured to drive the swing rod to rotate.

17. The effortless resettable engine switching structure according to claim 16, wherein the swing rod is provided with a cooperating inclined surface; the driving component is configured to abut against and cooperate with the cooperating inclined surface, such that the driving component moves to drive the swing rod to rotate; an outer periphery of the second pin shaft located outside the main body is provided with a polygonal element; and the swing rod is further provided with a polygonal groove configured to cooperate with the polygonal element, such that the swing rod and the switching bracket rotate synchronously.

18. The effortless resettable engine switching structure according to claim 11, wherein a second end of the switching bracket is provided with a shaft hole and a pin shaft, wherein the shaft hole and the pin shaft are coaxially arranged; a protruding post is provided in the water division chamber and configured to cooperate with the shaft hole;

the pin shaft is configured to extend outside the main body; a gear is further provided on the main body and rotatable synchronously with the pin shaft; the main body is further provided with the driving component for driving the gear to rotate; and the driving component is provided with a rack configured to mesh with the gear.

19. The effortless resettable engine switching structure according to claim 18, wherein a sealing ring is sleeved on an outer periphery of the pin shaft and configured to hermetically cooperate with the main body; a clamping slot is formed in the pin shaft located outside the main body; the gear is sleeved on the outer periphery of the pin shaft;

and an inner periphery of the gear is provided with a connecting key configured to cooperate with the clamping slot.

* * * * *